Dec. 7, 1937.    F. PONTON    2,101,343
TENSIONING APPARATUS FOR MEAT AND BONE CUTTING MACHINES
Filed April 20, 1936    2 Sheets-Sheet 1

Inventor;-
Fortunat Ponton,
By
Wilson, Dowell, McCanna & Foley Atty's.

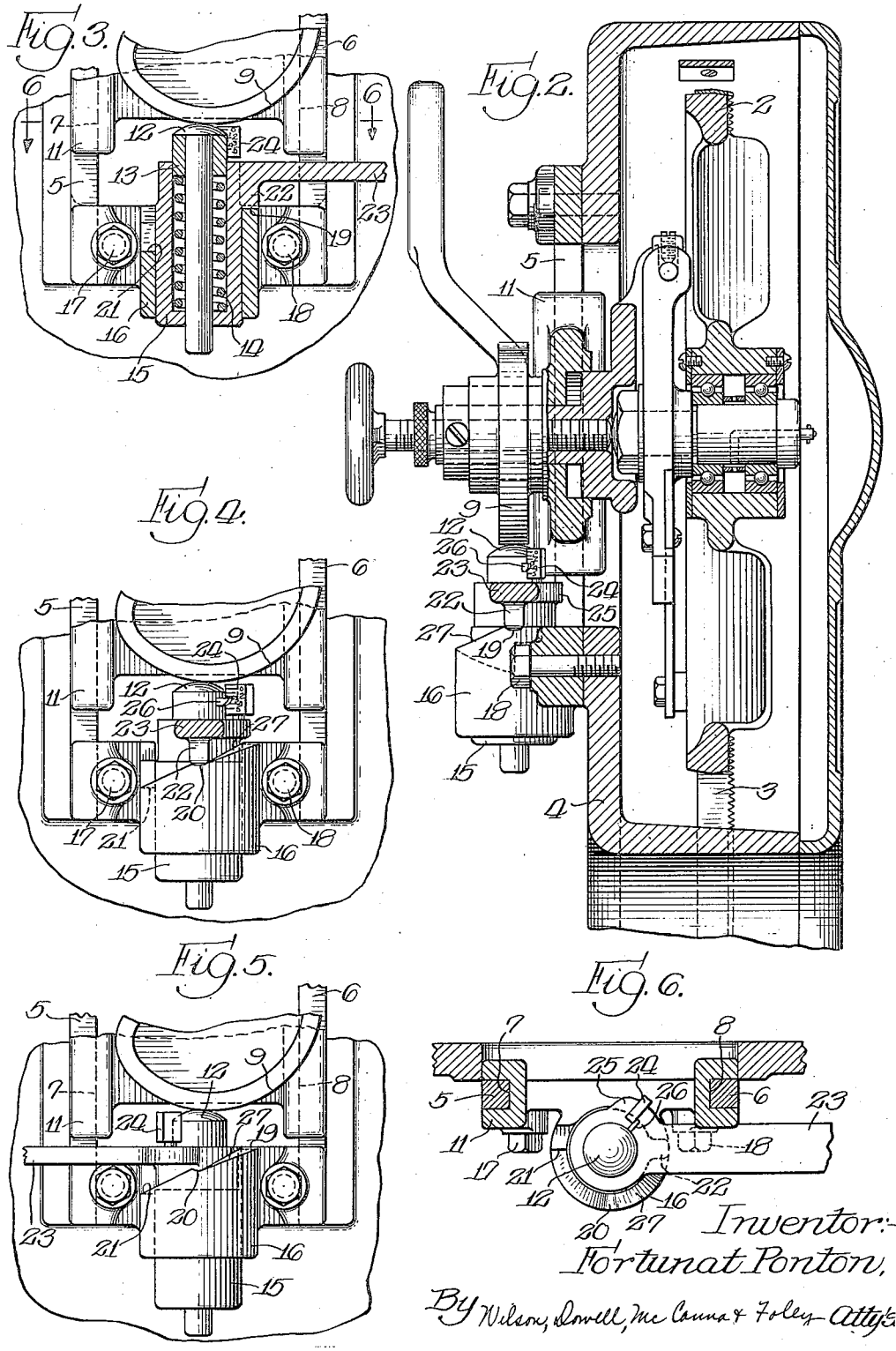

Patented Dec. 7, 1937

2,101,343

UNITED STATES PATENT OFFICE 2,101,343

TENSIONING APPARATUS FOR MEAT AND BONE CUTTING MACHINES

Fortunat Ponton, Chicago, Ill., assignor to Vaughan Company, Chicago, Ill., a corporation of Illinois Application April 20, 1936, Serial No. 75,335

3 Claims. (Cl. 143—27)

This invention relates to tensioning apparatus for band saw blades and is illustrated herein as applied to a meat and bone cutting machine of the character shown in my prior Patent No. 1,967,724, issued July 24, 1934.

In the aforesaid prior patent, means was provided to enable the upper band saw wheel to be accurately adjusted upwardly or downwardly to vary the tension on the band saw. This object was accomplished by mounting the axis of the upper wheel on a vertically slidable block and employing a cam supported on said block to be rotated against a spring tensioned plunger or pin to enable the block to be raised gradually.

Further experience with the prior patented machine led to the discovery that there was not enough range of adjustment in the band saw tensioning apparatus, due to the fact that too much variation in band saw length was encountered frequently. While, obviously, band saws may be provided of a proper length to fit the upper and lower wheel spacing in any given machine, yet after such band saws have broken one or more times and have been welded again, they become shortened in the process of repair and may become too short for mounting even on a pair of adjustable wheels, such as were shown in my prior patent. Accordingly, a need for the present invention arose and I now provide a greater range of adjustment by employing a spring loaded pin which is carried by a casing which can be adjusted further from or closer to the center of the bottom wheel to accommodate band saws of different lengths. However, while providing for the accommodation of greater variations in band saw lengths, I have retained all the advantages of accurate adjustment of tension which were possessed by my prior patented device.

In the drawings which illustrate the invention as applied to meat and bone cutting machine:

Fig. 2 is in part a vertical section approximately on the line 2—2 of Fig. 1;

Fig. 3 is a detail view of a portion of the tensioning apparatus showing the tension device in position to accommodate a band saw of the longest length it is intended to tension;

Fig. 4 is a detail view of a portion of the tension apparatus adjusted into the position where it will accommodate a band saw of intermediate length;

Fig. 5 is a corresponding view showing adjustment of the tension device to accommodate a band saw of the shortest length which this device can accommodate; and Fig. 6 is a horizontal section on the line 6—6 of Fig. 3.

Figure 1:
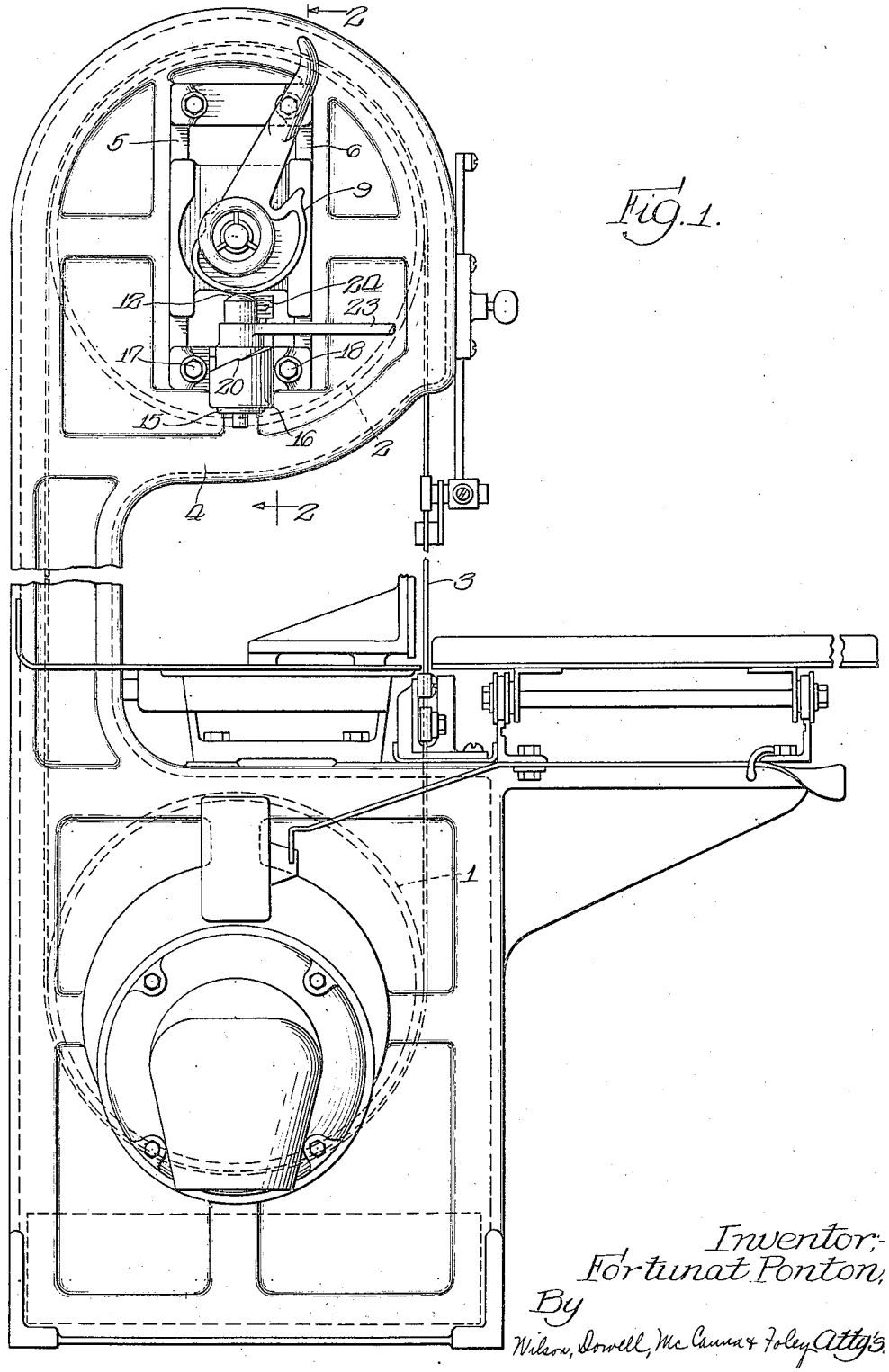
Fig. 1 is a side elevation of a band saw machine equipped in accordance with my invention.

My prior patent may be relied upon for a full description of all of the working parts of the machine, while in the present specification there will be described only that which is necessary for an understanding of the improvement in the tensioning apparatus.

For example, the band saw machine includes a lower wheel 1 and an upper wheel 2 on which the band saw 3 is stretched. The frame of the machine is generally indicated by the numeral 4 and includes a pair of guide bars 5 and 6 on which the block for supporting the upper wheel slides. This block is grooved as shown at 7 and 8 to embrace the guide bars 5 and 6. A cam 9 is rotatably carried upon the sliding block 11 and as it rotates it bears against the top of a pin 12. The pin is supported upon a collar 13 which rests upon a spiral spring 14 which is retained within a cage 15. The cage itself is rotatably mounted in a bracket 16 which is securely bolted to the frame of the machine by means of the bolts 17 and 18.

As shown particularly in Figs. 4 and 5, the bracket where it surrounds the cage 15 is provided with three notches 19, 20 and 21. The cage itself is provided with a projection 22 which, by means of the handle 23, may be rotated so as to drop into any of the three notches indicated. For example, Fig. 3 shows the projection resting in notch 19, Fig. 4 shows the projection extending into notch 20, while Fig. 5 shows the projection resting in notch 21.

Thus by rotating the cage 15 to drop it down or raise it relatively to the several positions represented by the notches, the pin 12 and its spring support are moved bodily toward or away from the lower wheel center. After setting the spring supporting cage in any one of the three possible positions, the cam 9 may then be rotated in contact with the plunger 12 compressing the spring 14 while gradually raising the upper wheel to thus tighten the band saw and give it the proper tension on its supporting wheels.

A gauge plate 24 is mounted upon a shoulder 25 forming a part of the cage 15, while a pointer 26, secured to the collar 13 will move upwardly or downwardly in front of the gauge plate whenever the cam is rotated to compress or release the spring 14. As the handle 23 is rotated to drop the cage down to a lower notch or raise it to a higher notch along the cam-way 27, the gauge plate 24 and the pointer 26 will accompany the gauge in its rotation. Due to the particular position of the gauge plate on the shoulder 25, this plate will remain visible and readable in all positions of adjustment of the spring cage.

Because of the very gradual increase in the radius of the cam 9, it will remain in any position to which it is rotated when the band saw is tightened to a proper working tension. No lock nut or similar device is necessary. Because of this gradual increase the adjustment of tension can be accomplished accurately. Furthermore, in view of the fact that the spring tensioned plunger can be supported in various different positions by adjusting the cage 15, the above described advantages of self-locking and accuracy of adjustment can be retained and used no matter where the cage is positioned. Furthermore, when a very short blade is being placed over the wheels there is no need for the upper wheel to be under tension in order to receive the blade. The combination of the cam and the adjustable cage for supporting the spring tensioned plunger enables the operator to place long, short or medium length blades accurately under the same tension.

Preferably the spring 14 is quite heavy and when entirely relieved of pressure will not expand enough to push the sleeve 13 entirely up out of the cage.

More than three notches in the supporting bracket may be provided, if desired, and the length of the spring supporting cage and the spring which it supports may also be varied, as desired.

It should be understood that the invention is susceptible of considerable variation and modification, differing from the preferred disclosed embodiment, yet remaining within the scope of the claims which follow.

Having shown and described my invention, I claim:

1. In combination with a pair of band saw wheels and a rotatable cam operatively connected with one of said wheels whereby rotation of the cam in one direction moves that wheel away from the other, a reciprocable abutment member against which the cam slides during its rotation, a spring supporting said member yieldably thrusting said member against said cam, a rotatable and reciprocable cage for retaining said abutment member against sideways movement and retaining one end of said spring, and means cooperating with said cage in different angular positions thereof for retaining said cage selectively in a plurality of positions at different distances longitudinally along the center to center line of said wheels.

2. In combination with a pair of band saw wheels and a rotatable cam operatively connected with one of said wheels whereby rotation of the cam in one direction moves that wheel away from the other, a plunger against which the cam slides during rotation and a spring supporting the same, a rotatable cylindrical cage for retaining the plunger and spring and having a lateral projection, and a housing for said cage having a plurality of vertically spaced notches connected by an inclined slide for cooperating with said projection upon rotation of the cage for selectively positioning said first means at a plurality of different distances from said other wheel.

3. The combination with a pair of band saw wheels of an adjustable cam member whereby one of said wheels is supported in selectively spaced relation to the other wheel to produce the desired tension on a band saw encircling said wheels, a yielding abutment supporting said cam, and means whereby said abutment may be adjusted to accommodate said wheels to band saws of various lengths, said means including a stationary hollow bracket having an inclined end, a cylindrical cage carrying said yielding abutment and supported in said bracket for rotative and axial movements relatively thereto, said cage being provided with a projection engageable with the inclined end of said bracket to impart axial movement to the cage upon rotation thereof relatively to the bracket and manually operable means for rotating said cage.

FORTUNAT PONTON.